United States Patent [19]

Engelmann et al.

[11] Patent Number: 5,196,401

[45] Date of Patent: * Mar. 23, 1993

[54] METHOD OF ENHANCING ROCK FRAGMENTATION AND EXTENDING DRILL BIT LIFE

[75] Inventors: William H. Engelmann, Henderson, Nev.; Pamela J. Watson, Inver Grove Heights; Sanaa E. Khalafalla, Minneapolis; John E. Pahlman, Bloomington; Patrick A. Tuzinski, Minneapolis, all of Minn.

[73] Assignee: The United State of America as represented by the Secretary of the Interior, Washington, D.C.

[*] Notice: The portion of the term of this patent subsequent to Sep. 25, 2007 has been disclaimed.

[21] Appl. No.: 553,510

[22] Filed: Jul. 18, 1990

Related U.S. Application Data

[63] Continuation-in-part of Ser. No. 211,650, Jun. 27, 1988, Pat. No. 4,959,164.

[51] Int. Cl.$^5$ ............................................... C09K 7/02
[52] U.S. Cl. ................................... 507/120; 507/136; 175/46; 51/322; 82/900; 125/11.22
[58] Field of Search ................... 507/139, 136, 120; 175/46; 51/322; 82/900; 125/11.22

[56] References Cited

U.S. PATENT DOCUMENTS

| | | | |
|---|---|---|---|
| 2,589,949 | 3/1952 | Meadors | 507/139 |
| 2,829,430 | 4/1958 | Toulmin, Jr. | 29/424 |
| 3,520,313 | 7/1970 | Seymour | 166/308 X |
| 3,663,477 | 5/1972 | Ahearn | 252/311.5 |
| 3,720,216 | 3/1973 | Wartman et al. | 137/13 |
| 3,747,681 | 7/1973 | Davis, Jr. et al. | 166/307 |
| 3,836,465 | 9/1974 | Rhudy et al. | 507/139 |
| 3,836,565 | 9/1974 | Rhudy et al. | 558/305 |
| 3,922,821 | 12/1975 | Canterbury | 51/322 X |
| 4,316,811 | 2/1982 | Burns et al. | 252/88 |
| 4,507,210 | 3/1985 | Lauzon | 507/139 |
| 4,765,415 | 8/1988 | Khalafalla et al. | 175/50 |
| 4,830,765 | 5/1989 | Perricone et al. | 507/139 |
| 4,959,164 | 8/1990 | Engelmann et al. | 507/139 |

OTHER PUBLICATIONS

Mondshine, *Oil and Gas Journal* (Dec. 7, 1970), pp. 70-77.

*Primary Examiner*—Gary L. Geist
*Attorney, Agent, or Firm*—E. Philip Koltos

[57] ABSTRACT

A method of enhancing the fragmentation and excavation of hard, solid materials such as rock formations is provided which comprises adding to the rock surface an aqueous solution including a high molecular weight nonionic polymer such as polyethylene oxide which is capable of hydrogen bonding with water to produce charge-neutralizing positive charge dipoles. The nonionic polymeric solution is thus capable of neutralizing the rock surface charge and obtaining a condition of zero surface charge (ZSC) so that the drilling, tunneling, cutting or other similar operation can be conducted with substantial increases in drilling performance and penetration rate. The method is also extremely effective in extending the lives of drill bits, cutting tools, grinding media, or other polishing or drilling tools such that an enormous savings in terms of replacing equipment can be achieved. The method of the present invention is particularly advantageous in that the nonionic polymer solutions of the invention are effective over a wide range of concentrations in neutralizing the rock surface charge, which has not been the case with previously used methods involving cationic compounds which were only effective at very specific concentrations. The method of the present invention provides a means for enhancing performance and achieving substantial cost savings in a wide variety of drilling, tunneling, cutting and other similar operations.

20 Claims, 7 Drawing Sheets

METHOD OF ENHANCING ROCK FRAGMENTATION AND EXTENDING DRILL BIT LIFE

The invention described herein was made by employees of the U.S. Government and may be manufactured and used by or for the Government for Governmental purposes without the payment of any royalties thereon or therefore.

RELATED PATENT APPLICATION

This is a Continuation-In-Part of patent application Ser. No. 07/211,650, filed Jun. 27, 1988, now U.S. Pat. No. 4,959,164, the disclosure of which is incorporated herein by reference.

BACKGROUND OF THE INVENTION

The invention pertains to drilling and rock excavation including drilling for exploration, mining, mineral development, and sampling and monitoring wells such as gas, oil and water wells. The invention will be applicable to the mining industry, the dimension stone industry, the construction industry, the oil and gas industry, and any other industries that are involved in the drilling, cutting, and grinding of rock, coal, or concrete, or in tunneling through rock. Furthermore, the invention should be applicable to the cutting, drilling, and grinding of other materials including metals, ceramics, other refractory materials, and also biological caries as in dental drilling of teeth.

Drilling and rock excavation represent a significant segment of the total mining system, and yearly drilling costs for five segments of the mining industry, namely copper/molybdenum, iron/titanium, lead/zinc, gold/silver, and crushed/dimension stone in the United States are about 1.5 billion dollars. Drill bit costs represent about 600 million dollars per year or about 40 percent of the total drilling costs. Increasing the bit life by 100 percent can translate into yearly savings of 300 million in drill bit costs.

Significant savings could also be achieved if a method is devised for greatly enhancing the penetration rate and the total penetration associated with rock drilling and tunneling while simultaneously extending the life of the bits, cutting tools and grinding media. Therefore, significant savings could be realized in general drilling costs if a method is devised which allows for increased drilling rates at constant applied mechanical stress during the drilling or tunneling, yet which at the same time prevents bit wear.

Known in the prior art are methods of maintaining the properties and parameters of a drilling fluid by introducing chemical agents into the drilling fluid while it circulates in a well. For example, Mamadzhanov et al in U.S. Pat. No. 4,410,052, issued Oct. 18, 1983, maintain the well integrity by adjusting the redox potential of the flushing fluid to the value determined at the moment of tapping the bed rock. This eliminates the ion exchange reactions between the bed walls and the flushing fluid and therefore maintains the natural permeability of the oil or gas productive well. This method is not concerned with enhancing drilling for excavation. Mamadzhanov et al in U.S. Pat. No. 4,385,666, issued May 31, 1983, maintain and control the properties and parameters of drilling muds by adjusting their oxidation/reduction potential (redox) at present values. This is done to maintain the rheological stability of the drilling mud which often gets diluted and changed in composition by ion exchange reactions in deep oil and gas well drilling and not to enhance the drilling rate or prolonging the drill bit life. Alekhin et al in U.S. Pat. No. 4,342,222, issued Aug. 3, 1982, used the redox potential of the drilling mud to determine the depth of a fluid-saturated stratum and the type of fluid such as mineralized water, oil, or gas released. Mixing the drilling mud with any of these fluid types changes its redox potential in a given direction, which identifies the nature of the fluid. This does not effect enhanced drilling productivity. Johnson and Kelly in U.S. Pat. No. 3,307,625, issued Mar. 7, 1967, pertains to wells formed when a subsurface source of hydrogen sulfide ($H_2S$) is encountered. Liberation of $H_2S$ (a weak acid) can lower the pH of water to a point where the drill metal starts to corrode. To prevent this corrosion, they added an alkali metal hydroxide or sulfide, e.g. NaOH or $Na_2S$ to raise the pH of the drilling fluid to the 7 to 9 range. None of these prior art references mentioned above are pertinent to increasing drilling productivity.

It has been found that maximum increases in drill penetration can be obtained simultaneously with maximum increases in bit life by using concentrations of chemical additive solutions, such as cationic organic surfactant and inorganic salt solutions, that neutralize the naturally-occurring negative charge on the rock surface, thereby producing a zero zeta potential or zero surface charge (ZSC) condition (cf., Engelmann et al, Zeta Potential Control for Simultaneous Enhancement of Penetration Rates and Bit Life in Rock Drilling, BuMines RI 9103, (1987), and Zeta Potential Control for Enhanced Drilling of Taconite and Other Hard Rocks, 60th Annual Meeting of the Minnesota Section, AIME and 48th Annual Mining symposium, pp. 6–1 to 6–22; and Khalafalla et al, U.S. Pat. No. 4,705,445).

The present invention provides a means for enhancing drilling rates while also prolonging the bit life at constant applied mechanical stress during drilling operations. This is accomplished by virtue of the discovery that enhanced drilling rates are a function of the rock surface condition, and that, if the rock surface is maintained at the zero point of charge (ZPC), or zero surface charge (ZSC) condition, regardless of the salt type or concentration or water source, enhanced drilling rates coupled with prolongation of the bit life are obtained. It has now been determined that water-soluble, nonionic, high molecular weight, organic polymers such as the polyalkylene oxide class of polymers including polyethylene oxide (PEO) are able to produce the ZSC condition.

SUMMARY OF THE INVENTION

It is an object of the present invention to provide a method of enhancing rock fragmentation during drilling, cutting, tunneling, grinding, and other similar operations conducted at constant applied mechanical stress while also prolonging the life of the drill bits, cutting tools, grinding media, and other equipment used in these processes.

A further object of the invention is to provide a drilling, cutting, tunneling and grinding fluid which produces a zero surface condition (ZSC) on the working surface.

It is a further object to provide a drilling, cutting, tunneling, grinding, and polishing fluid with a nominally nonionic, high molecular weight, water-soluble polymer to produce favorable ZSC conditions over a wide range of concentrations in order to increase penetration rates and extend the life of bits, cutting tools, grinding media, and polishing tools.

In accordance with the present invention, these and other objects are obtained using a method comprising the steps of:

a) providing an aqueous solution containing a high molecular weight nonionic polymer capable of hydrogen bonding with water to produce charge-neutralizing positive charge dipoles;

b) determining the minimum concentration of the aqueous solution that will be effective in neutralizing the surface charge of the solid and producing a zero surface charge (ZSC) condition on the solid; and c) adding to the solid during the drilling, tunneling, cutting, grinding, polishing or other similar operation the aqueous solution at a concentration equal to or greater than the minimum concentration that will be effective in neutralizing the surface charge of the solid and producing a zero surface charge (ZSC) condition on the solid.

The method of the present invention will thus be extremely advantageous in extending drilling bit life and improving the efficiency of drilling operations, both of which will result in a tremendous savings in terms of time and money.

Other objects, embodiments, and advantages of the present invention will be inherent from or described in the detailed description herein below.

DETAILED DESCRIPTION OF THE PREFERRED EMBODIMENTS

Figure 1:
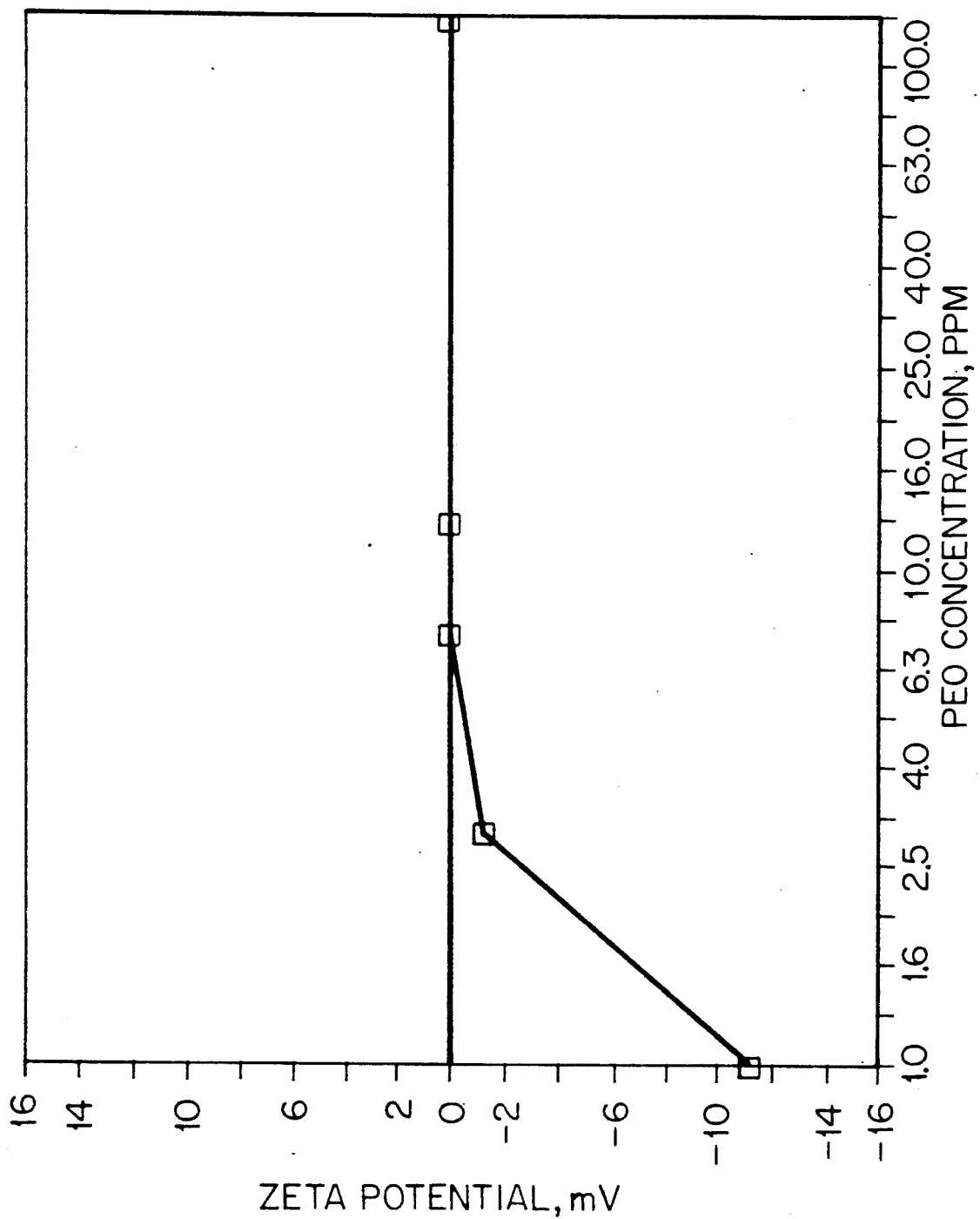
FIG. 1 shows the variation of zeta potential with additive concentrations for Sioux Quartzite in PEO solutions.

In the drilling procedures utilized by most drillers it is preferred to drill dry, i.e., to use only air flushing to remove rock particles. However, this method actually involves drilling with air containing a water mist for suppression of the accompanying undesirable large amounts of generated dust.

In past and present research efforts, it has been discovered that laboratory results of drilling tests are very sensitive to the chemical makeup of the water used in the test with cationic additives. For a given batch of distilled, deionized water, drilling data were reasonably reproducible, and the data trends remain the same from one batch of distilled water to another. The use of mine water and municipal tap water in zeta potential determinations and additive drilling tests showed that the presence of anions in these waters greatly affected the concentration of the chemical additive required to neutralize the negative rock surface charge. This was likely because these ions also affect the equilibrium of the electric double layer at the rock/solution interface. Thus, prescribed concentrations of salts for enhanced drilling conditions, such as those given in the literature, can be misleading if the chemical makeup of the water is not taken into consideration. Research associated with the present invention has revealed that for enhanced drilling, the zero surface charge (ZSC) condition has to be maintained on the rock surface regardless of the water source chemistry.

In accordance with the method of the present invention, there is provided a group of nonionic polymers that can hydrogen bond with water molecules to produce positively charged dipoles that are capable of neutralizing surface charge on solids and bringing about the desired surface charge condition over a wide range of concentrations. These nonionic polymers thus allow for increased fragmentation rate and prolonged bit, tool, or media life over that wide range of concentrations. By maintaining the nonionic polymer applied to the rock surface at a concentration within that range of concentrations necessary to obtain the neutralization of surface charge, one will be able to maintain a condition of zero surface charge on the drilling surface which will greatly benefit the drilling operation and result in enhanced fragmentation performance.

The enabling condition of the invention is the discovery that this special group of nonionic polymers can neutralize surface charge and bring about the needed zero surface charge condition which is required for enhanced fragmentation performance. The particular nonionic polymers that will be useful in the present invention, however, represent only a small percentage of the many known nonionic polymers. In general, most all nonionic polymers and most all nonionic surfactants will not be able to neutralize surface charge and bring about the ZSC condition because they are neutral or non-charged species. However, a particular class of nonionic polymers has been found which is capable of neutralizing surface charge and bringing about the ZSC condition, and this class consists of nonionic polymers that can hydrogen bond with water molecules and produce positive dipoles on exposed hydrogen atoms of the water molecule. It is these positive dipoles which can interact with the preponderance of solid materials in the world that are negatively charged in order to neutralize or shield the solid's negative surface charge and thereby bring about the ZSC condition. It is particularly preferred for maximizing the neutralization of charge that these hydrogen bonding nonionic polymers be of relatively high molecular weight. It is also preferred that they be water soluble.

In particular, the invention is suited for working on solid materials normally operated on in the drilling industry, including rock, coal, concrete, and other natural hard surfaces. However, the invention makes use of the fact that these polymers hydrogen bond with water molecules and produce positive dipoles on the exposed hydrogen atoms of the water molecule. As a result, these polymers can be suitably used on any of the many negatively charged solid materials that are also subject to drilling operations. Included are such materials as metals, ceramics, other refractory materials, and biological substrates which are drilled into such as bones and teeth.

The main difference between cationic materials and the nonionic materials of the present invention is their charge structure, i.e., one is cationic and the other is nonionic, which would lead one to believe that in accordance with the theory of charge interaction and neutralization that the nonionic one should have no effect on a solid's surface charge at all. Another difference between the two is that the special hydrogen bonding nonionic polymers can produce the zero surface charge condition over a wide range of concentrations, as opposed to the cationic materials which only produce a zero surface charge at a very specific concentration. This is true because even when the surface charge of a solid has been neutralized by the nonionic polymers of the present invention, it still does not later become positive even if the concentration of the nonionic polymers is increased. In the case of cationic materials, a certain amount of material must be added in order to neutralize the surface charge, but when concentrations of the cationic materials are increased, the surface charge then become positive. In the case of the nonionic polymers, however, once the surface charge is neutralized, there is no longer any surface charge to attract the dipoles of the nonionic polymer-water species, and the addition of increased amounts of the nonionic polymer, being inherently neutral or non-charged, will have no further effect on the surface charge of the solid.

In accordance with the invention, it has been determined that high molecular weight polyalkylene oxides are most suitably used as the nonionic polymer of the present invention. These polymers are capable of hydrogen bonding with water to produce the charge-neutralizing positive charge dipoles that will be effective in neutralizing the surface charge of a solid and producing the ZSC condition. In particular, it has been found that polyethylene oxide is most suitable for the present invention. However, other polyalkylene oxides such as polypropylene oxide can also be used in the invention. The minimum concentration of polyethylene oxide that can bring about the zero surface charge condition in many solids faced in drilling operations can be as low as about 1-3 ppm. After this minimum is achieved, the PEO is still effective over a wide range of higher concentrations, even up to about 1,000 ppm. The polyethylene oxides have been observed to be most effective in the range of from about 1-150 ppm in neutralizing surface charge. At the high end of the total effective range, i.e., 750-1000 ppm, problems with increased viscosity will develop that might detract somewhat from the effectiveness of the present invention.

It is also the case that certain polyacrylamide-based nonionic polymers which are capable of hydrogen bonding with water and neutralizing the surface charge on solids can also be used in accordance with the present invention. One proprietary polyacrylamide-based nonionic polymer that has been used successfully in the present invention is known as Percol 333 made by the Allied Colloids company. The Percol 333 nonionic polymer has been effective in neutralizing the surface charges in rocks and other solid materials when used in the range of from about 10 ppm to over 100 ppm. Most suitably, the effective range of Percol 333 is about 10 to about 150 ppm, though greater concentrations will also be effective in producing the ZSC condition. Many other nonionic polymers and surfactants have also been tested, but as the theory of charge neutralization would suggest, very few have been found which affect the surface charge of a solid.

In the preferred method of the present invention, increases in the fragmentation rate of a drilling operation or other similar operations such as tunneling, cutting, grinding, or polishing, are obtained by first providing an aqueous solution of high molecular weight nonionic polymers that are capable of hydrogen bonding with water in order to produce charge-neutralizing positive charge dipoles. Next, preferably under laboratory conditions, on specific solids such as rocks, coal or concrete, the minimum concentration of that aqueous solution which will be effective in neutralizing the surface charge of the solid and producing a zero surface charge condition on that solid is determined. Once this minimum concentration is determined, a suitable aqueous solution prepared at a concentration of the nonionic polymer equal to or greater than this minimum concentration will be added to the solid during the drilling, tunneling, cutting, grinding, polishing or other similar operation to effect surface charge neutralization and increase the fragmentation rate of the drilling operation. The use of these nonionic polymer additives will also prolong the life of the drill bit, cutting tool, or other polishing, grinding, or drilling tool used during these operations. It is contemplated that the addition of the nonionic polymers in the present invention will be suitable in any drilling operation using a drill bit or other tool at a constant applied stress.

While it will be sufficient to determine a minimum concentration of the nonionic polymer solution that will be effective in neutralizing surface charge of the solid being worked on, it is also possible to determine a range of concentrations over which the nonionic polymer solution will be effective in producing the ZSC condition. Normally, for nonionic polymers such as polyethylene oxide, this is quite a wide range, and typically the PEO solutions will be effective from about 1 ppm PEO to about 1,000 ppm PEO. However, due to the viscosity problems discussed above, the lower end of this range is most preferably used in operations carried out within the scope of the invention. Preferably, the effective range of concentration for a solution including polyethylene oxide will be roughly from about 1-150 ppm PEO. Most preferably, the ideal concentration for effectively neutralizing surface charge will be under 100 ppm, and will most preferably be about 3-50 ppm. Once this effective range of concentrations is determined, it is important to maintain the concentration of the nonionic polymer solution applied on the solid within this range in order to continually neutralize the surface charge of the solid during drilling or other similar operations.

Although the nonionic polymer solutions of the present invention can be applied alone to the drilling surfaces being operated on, the solutions can be combined with anionic or cationic surfactants, water soluble oils, or other cutting fluids and used together in the drilling operation. In such a case, it is necessary to determine the minimum concentration of the water soluble oil that will be needed for lubrication in a drilling or cutting fluid that contains the nonionic polymers as described above. This amount of the water soluble oil when combined with the minimum concentration of the effective amount of the nonionic polymers, will give a solution useful for enhancing drilling performance which is effective in obtaining charge neutralization and a zero surface charge condition. The present method is advantageous in that the concentration of anionic or cationic oils used in the cutting process can be greatly decreased.

A nominally nonionic, high molecular weight, water soluble polymer in accordance with the present invention is able to produce the favorable ZSC condition over a wide range of concentrations, resulting in drilling penetration rates and extensions of drill bit life that are two to three times greater than those previously obtained using inorganic salts and cationic surfactants. The nonionic polymers of the invention are more beneficial than previously used compounds, more effective in obtaining enhanced drilling performance, and better adaptable to conventional drilling practices. Because the nonionic polymers of the invention are effective over a wide range of concentrations, the need to constantly monitor the concentration of this fluid, which is often recycled in many drilling processes, is eliminated. This is a distinct advantage since, when using the inorganic salts or cationic surfactants associated with prior methods, only specific amounts of those ingredients would give the required ZSC concentration. In the present invention, a continuous range of drilling fluid concentrations will achieve the ZSC concentration and result in enhanced drilling performance. The range of solution concentrations which produce the ZSC condition for a given water and type of solid can be determined using a commercial zeta potential determining apparatus.

Previously used methods employing a cationic additive as a surface charge modifier showed that in low concentrations, the rock particle surface charge was initially negative and with increasing additive concentration did reach a point where surface charge was neutral. However, from this point, addition of the additives at higher concentrations resulted in the surface charge becoming positive, and staying positive when the additives were applied at higher concentrations. For each additive, the maximum drilling performance had to be obtained with that singular finite solution concentration that produced the ZSC condition. The discovery that nonionic polymers such as polyethylene oxide (PEO) eliminated the problem of having to determine a specific additive concentration that would lead to the ZSC condition because additional amounts of PEO do not cause a subsequent increase in positive surface charge.

PEO had not been thought of as a surface charge modifier, and was initially tested as a drilling fluid additive because of its ability to flocculate particulates over a wide range of concentrations. Drilling with concentrations of PEO solutions over the wide range of flocculating concentrations would indicate whether the enhanced drilling performance at the ZSC condition with cationic additives was due in part to drilling particulate flocculation. Since PEO was nonionic, it was not expected to neutralize the rock surface charge. In fact, zeta potential determinations of rock particles in low molecular weight nonionic surfactants showed that these had no effect on the surface charge of those particles. The zeta potential determination using rock particles in solutions of ever increasing PEO concentration, however, showed that PEO, unlike the cationic additives, brought the zeta potential from an initial negative value to zero but did not later produce a positive zeta potential at higher concentrations. Instead, at higher PEO concentrations the zeta potential remained at zero, i.e., the ZSC condition was maintained. The ability of PEO to neutralize the rock surface charge thus is most likely due to the electronegativity differences in the ethylene oxide units of the PEO molecule.

There is evidence to suggest that PEO is hydrated in aqueous solution. This specific interaction may be a consequence of hydrogen bonding between water molecules and the ether oxygens of the PEO chains. The water dipoles are thus associated with PEO in such a way as to lose some degree of freedom, e.g., rotational degrees of freedom. Even though PEO is considered a nonionic polymer, the existence of these electric water dipoles along its chain length makes it a good candidate for occupying the inner Helmholtz plane of the electric double layer on the solid/liquid interface. Unlike the outer Helmholtz plane which is usually occupied by the counterions (e.g., cations in the case of negatively charged interfaces), the inner Helmholtz plane represents the plane of closest approach of anions and water dipoles. PEO is thus able to penetrate the double layer and neutralize the intrinsic charge on the rock surface, thereby acting as an "anchor polymer". The same mechanism would apply for other polyalkylene oxides, i.e., polypropylene oxide, etc. The positive water dipoles are able to neutralize an intrinsic negative charge on a rock while the negative water dipoles are able to neutralize an intrinsic positive charge on a sample.

PEO is unique compared to the cationic additives, because increases in PEO concentration beyond that necessary for surface charge neutralization do not result in a positive surface charge, i.e., the ZSC condition is maintained at higher PEO solution concentrations. In this case the maximum drilling performance was obtained at all concentrations tested that produced the ZSC condition. Thus, controlling the drill fluid additive concentration is much less critical. Effective concentrations for the polyalkylene oxides will vary as required for a particular drilling application, but commonly, these oxides will be applied in the range of anywhere from about 1 ppm to 150 ppm, and preferably about 3 to 50 ppm.

For application in rock drilling, common, state-of-the-art, percussive, rotary tricone, or diamond drills are employed which remove drilling particulates with a continuous water flush or with an air flush using a fine water mist. The solution of the water-soluble, high molecular weight, nonionic polymer is preferably prepared in a mixing tank using the available mine water and an effective amount of a nonionic polymer such as PEO that will result in a solution concentration that produces the desired ZSC condition. When drilling with air flush, a mist of the ZSC polymer solution replaces the water mist injected through the bit for dust suppression. When drilling with a water flush, the polymer solution is routed through the drill steel and injected through the bit at the bottom of the drill hole. If the drilling fluid is to be recycled, it can be collected in a sump pond wherein rock particulates and sediment are removed by settling, and the clarified drilling fluid is returned to the mixing tank for addition of the required makeup amount of PEO to produce the desired ZSC concentration solution. Because PEO acts as a flocculant or coagulant, ponding of drilling water will automatically clarify the sump pond solution for recycling as the flocculated drill particulates will settle to the bottom of the pond.

The PEO concentration of the clarified sump pond solution and mixing tank solution can be determined by analyzing total carbon present in the solution. The concentration of water-soluble anionic and cationic oils added to the drilling fluid for lubrication purposes can be eliminated, or at least reduced by drilling with PEO solutions. PEO has lubricating properties of its own which can eliminate the need for other lubricating additives. Also, PEO will attract the cationic and anionic water-soluble oil molecules and concentrate them at rock, drill bit and drill steel surfaces, thereby reducing the concentration of these oils needed in the bulk solution.

For application in tunneling, common state-of-the-art tunneling machines can be employed that lubricate the bits or cutting discs and flush out particulates with a circulating liquid. The ZSC polymer solution is prepared in a mixing tank using the available mine water and an amount of a nonionic polymer like PEO that will result in a solution concentration that produces the desired ZSC condition. When tunneling, the ZSC polymer solution is circulated through the bits or cutting discs on the machine and injected at the rock face being excavated. If the tunneling fluid is to be recycled, it is collected in a sump pond wherein rock particulates and sediment are removed by settling, and the clarified drilling fluid is returned to the mixing tank for addition of the required amount of PEO to produce the desired ZSC concentration solution. The PEO concentration of the clarified sump pond solution and mixing tank solution can be determined by analyzing for total carbon present in the solution.

For application in rock cutting, common state-of-the-art cutting tools such as diamond saws and wire saws can be employed that use a circulating liquid to flush out cuttings and lubricate the blades. The ZSC polymer solution is prepared in a mixing tank using the available quarry water and an amount of a nonionic polymer like PEO that will result in a solution concentration that produces the desired ZSC condition. When cutting, jets of the polymer solution are focused on the blade-rock interface at the area of cutting. The clarified drilling fluid is returned to the mixing tank for addition of the required makeup amount of PEO to produce the desired ZSC concentration, after rock particulates and sediment are removed by settling. The PEO concentration of the clarified solution and mixing tank solution can be determined by analyzing the total carbon present in the solution. The concentration of water-soluble anionic and cationic oils added to the cutting fluid for lubrication purposes can be eliminated or at least reduced by cutting with PEO solutions. PEO has lubricating properties of its own which can eliminate the need for other lubricating additives. Also, PEO will attract the cationic and anionic water-soluble oil molecules and concentrate them at rock and cutting tool surfaces, thereby reducing the concentration of these oils needed in the bulk solution.

For application in grinding, common state-of-the-art rod mills and ball mills are employed that operate on a continuous basis. The coarse ore is slurried with the polymer solution (grinding water) and introduced into the grinding mill. The ZSC polymer solution is best prepared by dosing proper amounts of a concentrated solution of PEO into the grinding water source, whether it be fresh or recycled water. The concentrations of PEO in the clarified recycled water and the grinding water are determined indirectly by measuring the viscosities of these waters, finding these values on the viscosity versus concentration calibration curve and reading the corresponding concentrations from the graph. Alternatively, the PEO concentration of clarified grinding fluid can be determined by analyzing for total carbon in the solution. The slurry of ground ore is filtered and the filtrate is recycled for PEO concentration adjustment before again being slurried with the coarse ore.

For application in coal cutting, common state-of-the-art cutting drums and plows are employed that use water sprays for dust reduction. The ZSC polymer solution is prepared in a mixing tank using the available quarry water and an amount of a nonionic polymer like PEO that will result in a solution concentration that produces the desired ZSC condition. When cutting, the ZSC polymer solution is sprayed on the coal surface instead of water. Dust reduction is likely to be accomplished because of the following mechanisms: (1) during cutting of coal with water-soluble, high-molecular-weight nonionic polymer solutions, cracking occurs more continuously instead of catastrophically; the former resulting in the generation of more large coal particles and less respirable dust, (2) in cutting coal, sharper bits produce less dust and since the nonionic polymer solutions retard bit and plow wear, cutting coal with these solutions will produce less respirable dust, and (3) the combination of the polymer's nonionic character and molecular bridging characteristics causes generated respirable dust to become agglomerated and stick to large coal fragments.

In addition to the improved coal cutting, improved bit life, and improved dust suppression obtained when cutting coal with ZSC concentration of the polymer solutions of the invention, another benefit is obtained if the cut coal is to be slurry transported in a pipeline. This benefit is the enhancement of the hydrodynamic flow rate of the coal slurry in the pipeline owing to the lubricative properties of the polymer (PEO). For application in dust suppression during drilling, tunneling, and cutting of solids other than coal, a ZSC concentration polymer solution replaces water in the flushing fluids, sprays and air-fluid mists normally used for dust reduction. The ZSC polymer solution is prepared in a mixing tank using the available mine water and an amount of a nonionic polymer like PEO that will result in a solution concentration that produces the desired ZSC condition. The mechanisms for dust suppression when drilling, tunneling and cutting other solids is similar to those listed above for cutting coal.

For application in permeability enhancement, common state-of-the-art hydrofracing methods are employed except that a ZSC concentration polymer solution replaces water as the hydrofracing fluid. The ZSC polymer solution is prepared in a mixing tank using available mine water and an amount of a nonionic polymer such as PEO that will result in a solution concentration that produces the desired ZSC condition. The ZSC concentration polymer solution, like the water in conventional hydrofracing, is introduced under pressure into injection wells in the rock formation to produce more fractures radiating from the well and thus improving permeability.

The use of the method of the present invention will thus be extremely advantageous in extending bit life during drilling activity, and enhancing performance in the many industries which involve drilling operations.

The following examples are presented for illustration only, and should not be construed as limiting the invention in any regard:

EXAMPLE I—DETERMINATION OF THE ZSC CONCENTRATIONS(S)

A ZSC concentration is an additive concentration that results in the neutralization of rock surface charges and brings the rock fragments to zero zeta potential. Zeta potential determinations were made on a Komline-Sanderson Model ZR-11 Zeta Reader. Rock fragments (about 0.2 gm) of minus 147 micron (minus 100 mesh) size were added to a stirred reservoir containing 1000 ml of the baseline water (distilled-deionized, tap, mine or mill). Inlet and outlet tubes from the zeta reader were introduced into the reservoir to allow the slurry of rock particles to be pumped into and out of the electrophoresis cell for determination of the zeta potential of the rock in the baseline water. The zeta reader uses a miniature television camera to display on the unit's video monitor the rock particle movement in the electrophoresis cell under an applied electric field of 10 volts per cm (V/cm). The potential of the rock particle was determined by matching the speed of a moving grid line (also displayed on the video monitor) to the speed of a rock particle using a balance potentiometer. The zeta potential was then read in millivolts (mV) on the unit's digital readout. Thirty readings were taken to get a statistically-valid average and standard deviation.

After the thirty zeta potential readings were recorded for a given rock in the baseline water (which were notably initially negative), a small precise dose of a concentrated additive stock solution was added to the reservoir and thirty readings were taken. Concentration of the additive was incrementally increased in this manner and thirty readings taken after each addition until several of the zeta potential readings were positive in the case of cationic additives or the concentration was 125 ppm in the case of PEO. Three complete sets of tests were run for each additive/rock combination and a graph of average zeta potential versus concentration plotted for each combination. The zero surface charge (ZSC) concentration(s) were taken to be the concentration at which the zeta potential plot intersected the zero potential line (cationic additives) or for PEO, the concentrations at which the zeta potential curve fell continually on the zero potential line.

Figure 2:
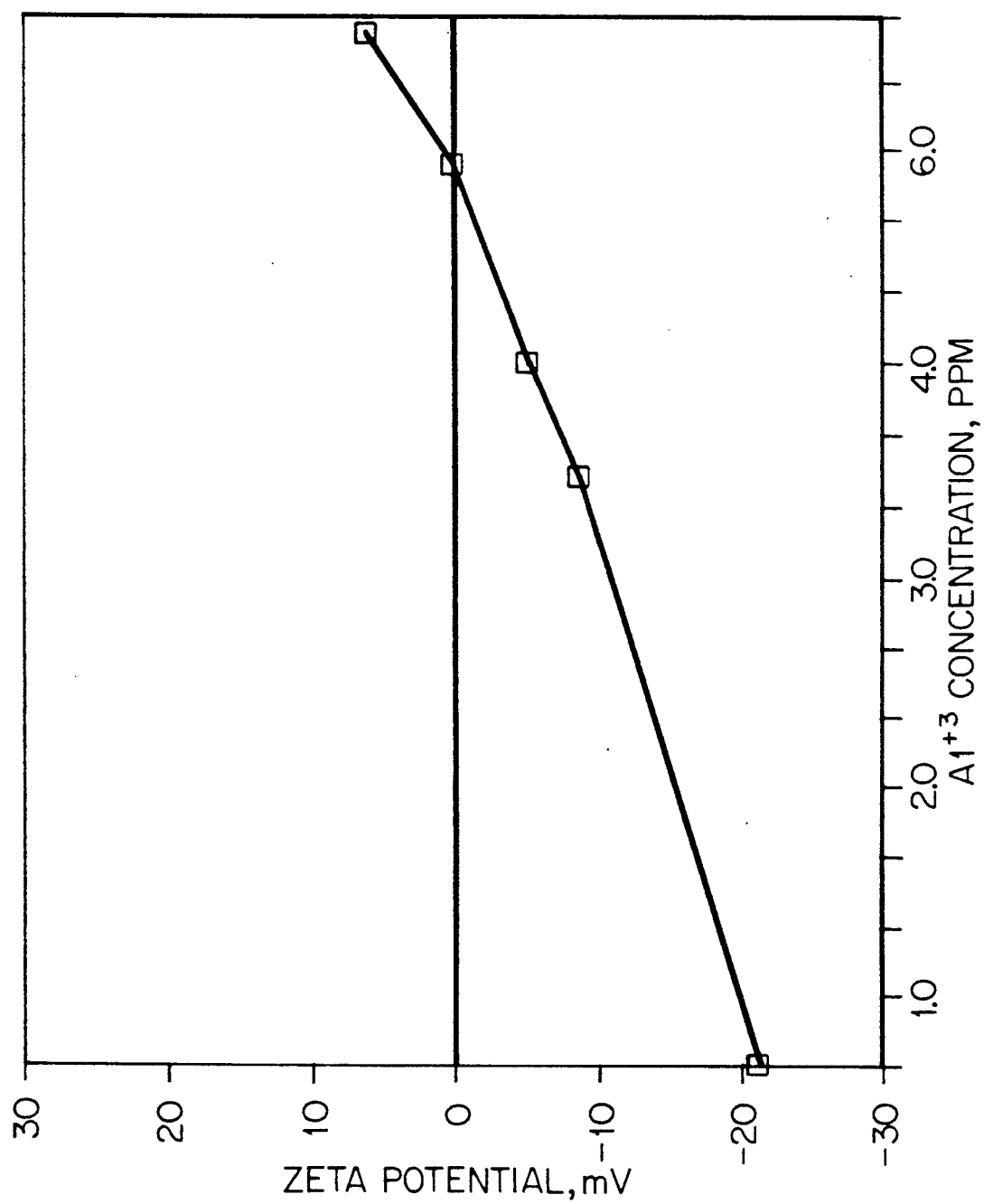
FIG. 2 shows the variation of zeta potential with additive concentration for Sioux Quartzite in $AlCl_3$ solutions.

FIG. 1 shows the variation of zeta potential with additive concentration for Sioux Quartzite particles in PEO solutions, while FIG. 2 shows this variation for Sioux Quartzite particles in solutions of AlCl$_3$ in acidified tap water. The unexpected wide range of ZSC concentrations typical for the high-molecular-weight, nonionic polymers in this invention and depicted in FIG. is clearly contrasted to the singular ZSC concentration typical for the cationic additives demonstrated previously and depicted in FIG. 2 for AlCl$_3$ in acidified tap water.

EXAMPLE II—MAXIMIZED DRILLING PENETRATION RATE AT ZSC CONCENTRATIONS

Drilling tests were conducted on a Houdaille Powermatic (1.13 Kw or 1¼ Hp) DC-controlled, variable-speed, industrial drill press adapted to use 16mm (⅝ in) diamond-impregnated coring bits. The bit rotation speed was 100 rev/min under 150 kg total load. Drilling fluid was pumped through the bit at a rate of 150 ml/min. Drilling in refractory fire clay brick, prior to each test, honed the bit to a sharpness corresponding to an initial average penetration rate of 4.5 mm/min.

Tests consisted of randomly drilling as many 12.7 cm (5 in) deep holes in a 15.2 cm (6 in) cube of rock as was necessary to dull the bit to a final "dull" state corresponding to an average penetration rate of 2.0 mm/min or less. Penetration of the bit was measured using a DC-to-DC linear variable differential transformer (LVDT). The output of the LVDT was connected to an analog-to-digital converter (ISSAC 91A computer interface), which sent the digitized signals to an Apple IIe microcomputer. The computer was programmed to determine the change in displacement from the LVDT output and to compute a new penetration rate every minute. An Epson MX-100 printer was used to record time (min), displacement (mm) and penetration rate (mm/min) every minute and total time, total displacement, and average penetration rate for each hole. Total penetration for drilling with either additive solutions or with the baseline water alone was the sum of the total displacements for all holes drilled in dulling the drill bit from the 4.5 mm/min "sharp" state to the 2.0 mm/min "dull" state.

The percent penetration effect for the additive was calculated as the difference between the total penetration (in mm) of drilling with the additive and with the baseline water alone, divided by the total penetration with the baseline water alone, and multiplied by 100.

Figure 3:
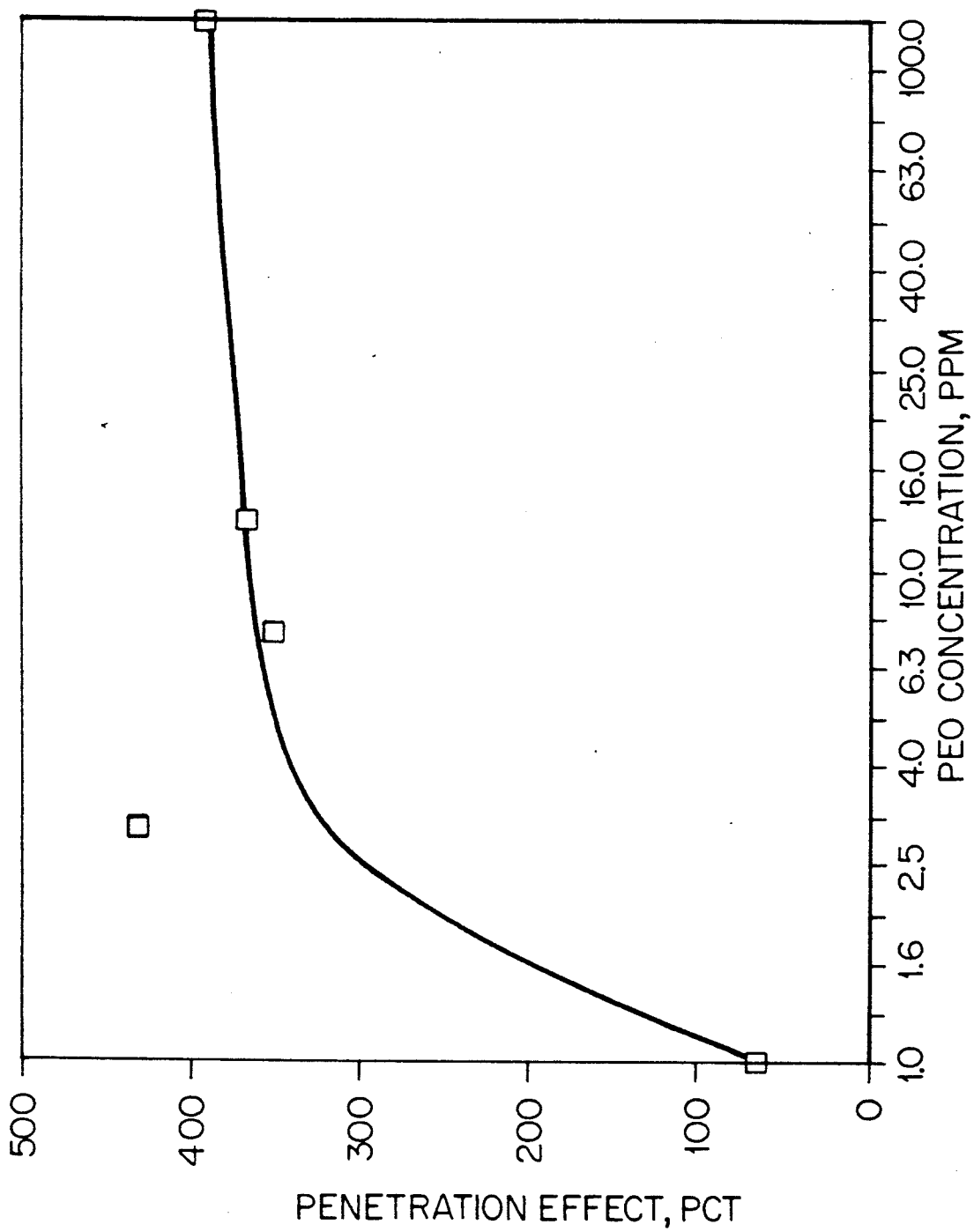
FIG. 3 shows the variation of the penetration effect with additive concentration for drilling Sioux Quartzite with PEO solutions.
Figure 4:
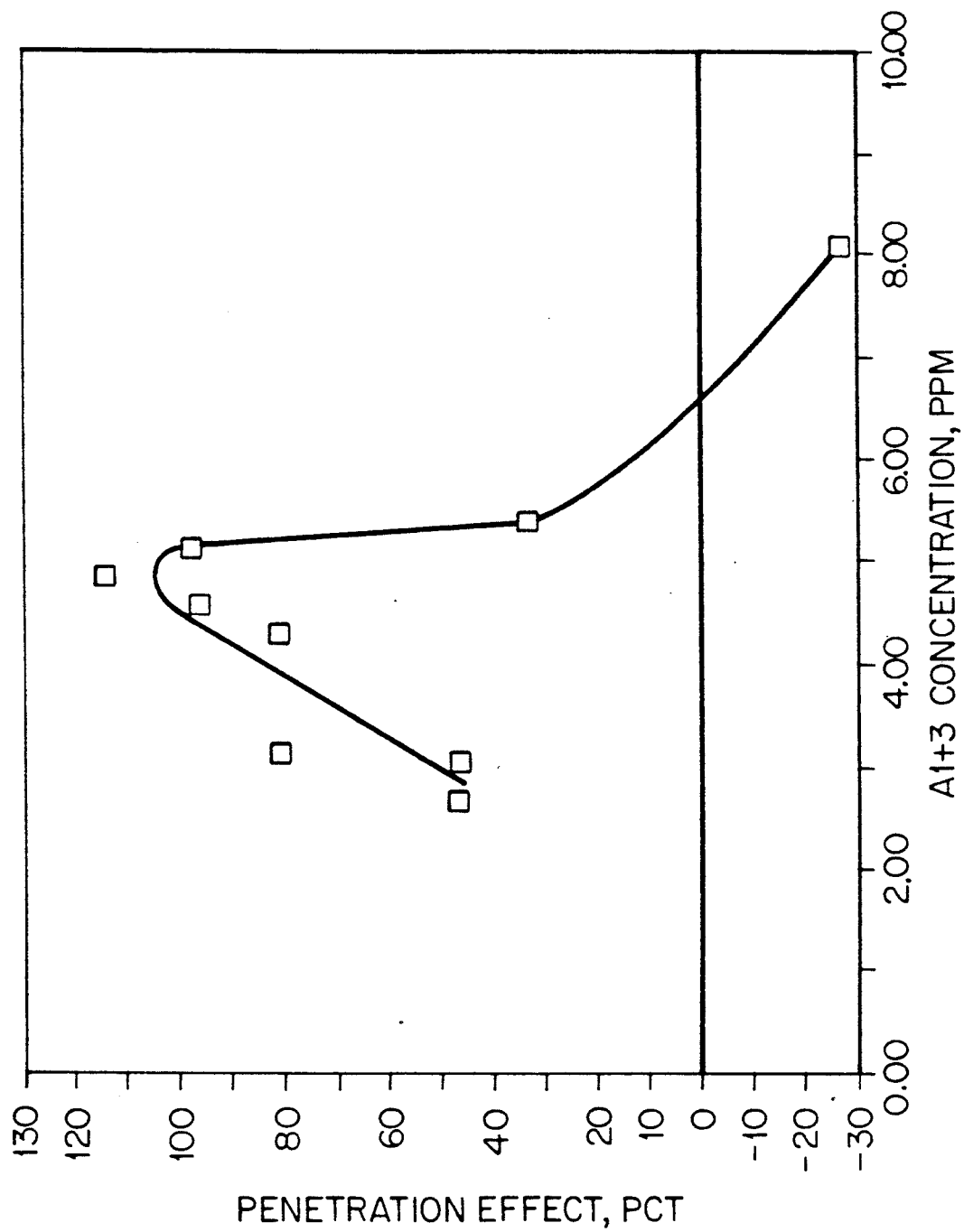
FIG. 4 shows the variation of the penetration effect with additive concentration for drilling Sioux Quartzite with $AlCl_3$ solutions.

FIG. 3 shows the variation of the penetration effect with additive concentration for drilling Sioux Quartzite with PEO solutions as drilling fluids, while FIG. 4 shows this variation for drilling Sioux Quartzite with solutions of AlCl$_3$ in acidified tap water as drilling fluids. Comparing the concentrations in FIGS. 3 and 4 which result in a maximum penetration effect is obtained at a ZSC concentration. Contrasting FIG. 3 with FIG. 4 clearly shows the advantages of the nonionic polymers of this invention over the cationic additives used previously. First, a penetration effect of over 350 pct is attained with the polymer compared to the penetration effect of around 100 pct attained with the cationic additive; a three-and-one-half-fold improvement in penetration effect. Second, there is a wide range of concentrations of the polymer (3 to 125 ppm) that produce a maximum penetration effect of 350 pct or greater, compared to the singular concentration of cationic additive that produces a maximum penetration effect around 100 pct. Also, Al$^{3+}$ ions hydrolyzes to Al(OH)$_3$ in naturally occurring tap water and mine water solutions above pH 4.5. Such hydrolysis renders Al$^{3+}$ ions ineffective in producing surface charge alterations. PEO does not hydrolyze and therefore its performance as a surface charge neutralizer is not affected by a wide range of pH in waters.

EXAMPLE III—MAXIMIZED BIT LIFE EXTENSION AT ZSC CONCENTRATION

Total time for drilling with either additive solutions or with water alone was the sum of the total times for all holes drilled in dulling the drill bit from the 4.5 mm/min "sharp" state to the 2.0 mm/min "dull" state.

The percent bit life effect for the additive was calculated as the difference between the total time (in min) of drilling with the additive and with water alone, divided by the total time with water alone, and multiplied by 100.

Figure 5:
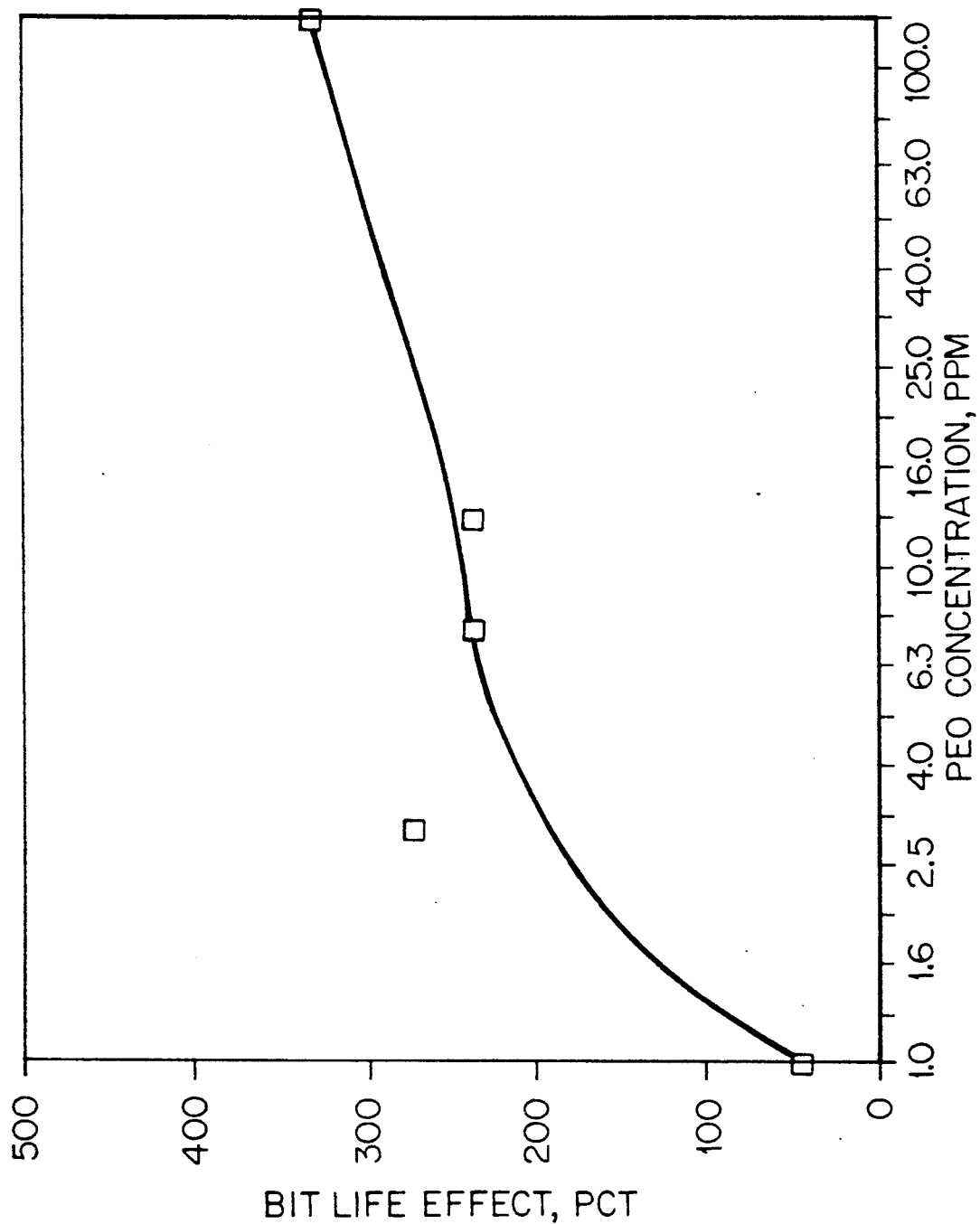
FIG. 5 shows the variation of the bit life effect with additive concentration for drilling with PEO solutions.
Figure 6:
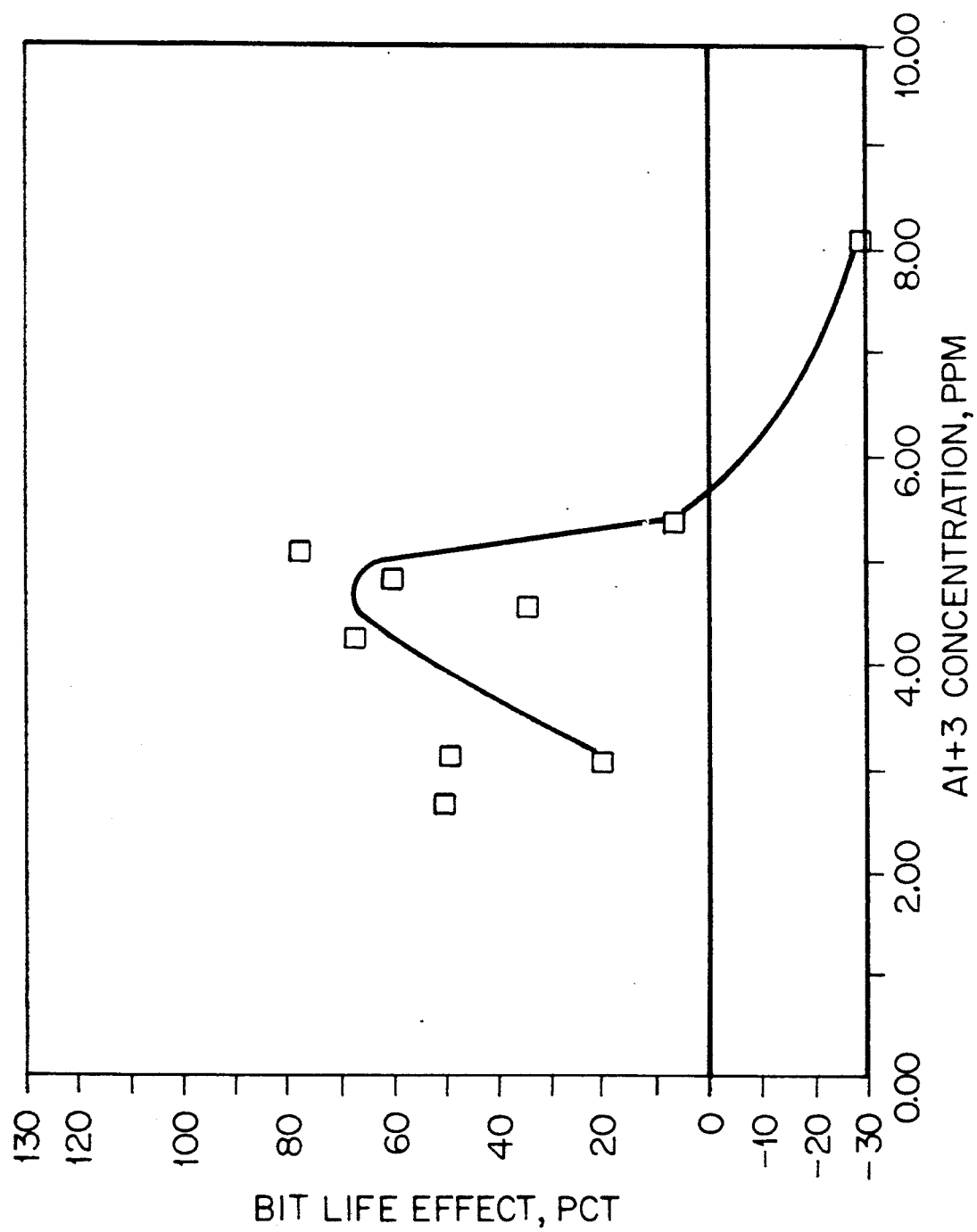
FIG. 6 shows the variation of the bit life effect with additive concentration for drilling Sioux Quartzite with $AlCl_3$ solutions.

FIG. 5 shows the variation of the bit life effect with additive concentration for drilling Sioux Quartzite with PEO solutions as drilling fluids, while FIG. 6 shows this variation for drilling Sioux Quartzite with solutions of AlCl₃ in acidified tap water as drilling fluids. Comparing the concentrations in FIGS. 5 and 6 that result in a maximum bit life effect with concentrations in FIGS. 1 and 2, respectively, that produce the ZSC condition shows that the maximum bit life effect is obtained at a ZSC concentration. Contrasting FIG. 5 with FIG. 6 again, clearly shows the advantages of the water-soluble, high-molecular-weight, nonionic polymers over the cationic additives described previously. First a bit life effect of over 235 pct is attained with the polymer compared to the bit life effect of around 100 percent attained with the cationic additive; a two-fold plus improvement in bit life effect. Second, there is a wide range of concentrations of the polymer (3 to 125 ppm) that produce a maximum bit life effect of 235 pct or greater, compared to the singular concentration of cationic additive that produces a maximum bit life effect of around 100 pct.

EXAMPLE IV—EFFECT OF ZSC CONCENTRATION OF POLYMER ON CUTTING PERFORMANCE

Cutting tests were made on South Dakota Mahogany Granite with a 71-cm-diameter (28-inch-diameter) diamond saw comparing the usage of three cutting fluids; water alone, water with a ½ pct ZEP LUBEEZE brand cutting oil (a fatty animal oil), and a 15 ppm solution of PEO. The PEO solution was prepared by adding a sufficient quantity of a concentrated PEO solution to 2,300 gallons of water to make the 15 ppm solution. The cutting oil solution was prepared by adding enough of the animal-base oil to the 2,300 gallons to make a ½ pct solution. The cutting fluid was sprayed at the blade/rock interface, collected, clarified, and recycled for reuse as the cutting fluid.

With the cutting results for water alone as the baseline, preliminary cutting performance results with the ZSC concentration PEO solution showed a 230 pct increase in penetration effect, while the cutting oil produced only a 67 pct increase in penetration effect. PEO solution as a cutting fluid is advantageous over the fatty oil because it not only results in more penetration per time than the cutting oil, but is less costly and doesn't become rancid with time. In fact, PEO is a nontoxic compound that is slowly biodegradable and is used in the food and beverage industry and in the preparation of denture adhesives. Furthermore, a smoother cut was made using ZSC PEO solutions as the cutting fluid compared to either water alone or with soluble fatty animal oil as the cutting fluid, thereby indicating that ZSC PEO solutions enhance the rock cracking and thus fragmentation radially, in the direction of the cut, and less on the fragmentation laterally, perpendicular to the cut. Furthermore, the amount of water soluble oil needed in the cutting fluid for lubrication was reduced from 7 barrels every 5 weeks without PEO addition to 1 barrel every 5 weeks with PEO addition.

EXAMPLE V—EFFECT OF ZSC CONCENTRATION OF POLYMER ON GRINDING

Two laboratory grinding tests were made of Minnesota Taconite using distilled water alone, and a 100 ppm PEO solution. The PEO solution was prepared by adding sufficient PEO to distilled, deionized water to make the 100 ppm solution. For each test, 600 grams of taconite, and 600 ml of grinding fluid were rotated at 60 RPM in a closed laboratory rod mill with 26 rods for 5 minutes. At the end of the tests, the ground products were wet screened, dried, and weighed. Initially, the taconite sample consisted of 39.0 pct minus 10 mesh, plus 16 mesh; 21.6 pct minus 16 mesh plus 20 mesh; 14.9 pct minus 20 mesh, plus 30 mesh; and 24.5 pct minus 30, plus 50 mesh material. The pH of both the water alone and PEO solution before and after grinding were 5.5 and 8.2, respectively.

Figure 7:
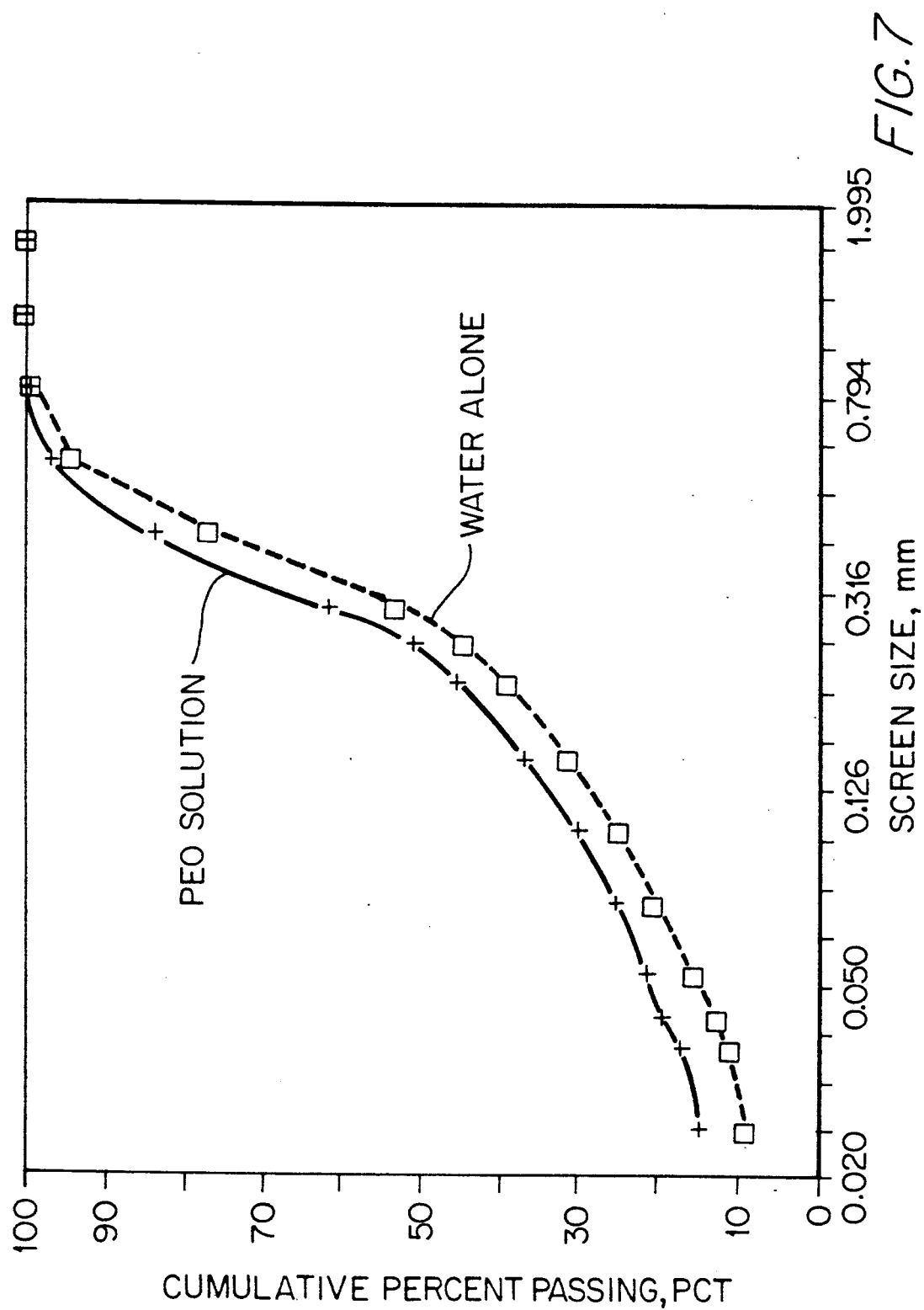
FIG. 7 shows the results of grinding tests on Minnesota Taconite in a PEO solution.

The results of the grinding tests are plotted in FIG. 7 and tabulated in Table 1. The grinding of taconite with PEO solutions resulted in more finer material, thereby indicating that grinding with PEO solutions results in increased comminution. Comparison of individual size fractions for the two grinding tests indicates a bimodal distribution of particles through the size fractions, i.e, −12+50 mesh: 7.2 pct more material for grinding with water alone; −50+200 mesh: 4.2 pct more material for PEO grinding; −200+325 mesh: 2.2 pct more material for grinding with water alone; and −325 mesh; 11.6 pct more material for PEO grinding. This is believed due to the difference in grindability of the two components of the taconite ore, the harder chert and the softer magnetite; the coarser two fractions (−12+50 mesh and −50+200 mesh) show that PEO aids in comminution of the chert, while the finer two size fractions (−200+325 mesh and −325 mesh) show that PEO aids in comminution of the magnetite.

EXAMPLE VI—IMPROVED FIELD DRILLING PERFORMANCE

Fifteen (15) inch diameter rotary tricone bits were used to drill 50-ft deep blastholes in Minnesota Taconite in Northern Minnesota. Drilling performances were compared for air-mist application of water alone and for air-mist application of ZSC concentration PEO solutions. Drilling penetration rates averaged 0.55 ft/min when drilling with water alone and 0.93 ft/min when drilling with ZSC concentration PEO solutions, an increase in penetration rate of 70 pct. Bit life averaged 2700 feet for the bits used when drilling with water alone and 3400 ft for bits drilled with ZSC concentration PEO solutions, an increase of 25 pct. In addition, when drilling with mist of ZSC concentration PEO solutions, the amount of dust around the drill was drastically reduced.

TABLE 1

Grinding Test Results on Minnesota Taconite

| Size Fraction U.S. Mesh Size | | Water Alone | | PEO Solution | |
|---|---|---|---|---|---|
| | | Percent | Cumulative Percent Passing | Percent | Cumulative Percent Passing |
| −12 | +16 | 0.02 | 100.00 | 0.01 | 100.00 |
| −16 | +20 | 0.59 | 99.98 | 0.39 | 99.99 |
| −20 | +30 | 5.13 | 99.39 | 2.36 | 99.60 |
| −30 | +40 | 17.66 | 94.26 | 13.44 | 97.24 |
| −40 | +50 | 23.29 | 76.60 | 21.90 | 83.80 |
| −50 | +60 | 8.65 | 53.31 | 10.79 | 61.90 |
| −60 | +70 | 5.50 | 44.66 | 5.65 | 51.11 |
| −70 | +100 | 7.62 | 39.16 | 8.60 | 45.46 |
| −100 | +150 | 6.46 | 31.54 | 6.92 | 36.86 |
| −150 | +200 | 4.28 | 25.08 | 4.74 | 29.96 |
| −200 | +270 | 5.02 | 20.80 | 3.68 | 25.20 |
| −270 | +325 | 2.82 | 15.78 | 1.99 | 21.52 |
| −325 | +400 | 1.84 | 12.96 | 2.38 | 19.53 |
| −400 | +500 | 1.85 | 11.12 | 2.16 | 17.15 |
| −500 | | 9.27 | 9.27 | 14.99 | 14.99 |
| Total | | 100.00 | | 100.00 | |

From the foregoing description it can be seen that this invention is susceptible of a wide variety of embodiments, and that this invention should therefore be construed not to be limited by the above description, but should be construed to be limited only by the scope of the appended claims.

What is claimed is:

1. A method of increasing the fragmentation rate of a solid and prolonging the life of a bit, cutting tool, grinding medium or other polishing or drilling tool during drilling, tunneling, cutting, grinding, polishing or other operation involving said tools comprising the steps of:
   a) providing an aqueous solution containing a high molecular weight nonionic polymer capable of hydrogen bonding with water to produce charge-neutralizing positive charge dipoles;
   b) determining the minimum concentration of the polymer in the aqueous solution that will be effective in neutralizing the surface charge of the solid and producing a zero surface charge (ZSC) condition on the solid; and
   c) adding to the solid during the drilling, tunneling, cutting, grinding or polishing operation the aqueous solution with the polymer concentration equal to or greater than the minimum concentration that will be effective in neutralizing the surface charge of the solid and producing a zero surface charge (ZSC) condition on the solid.

2. A method according to claim 1 wherein the drilling, tunneling, cutting, grinding or polishing operation is carried out under a constant applied stress.

3. A method according to claim 1 wherein the aqueous solution is a drilling fluid.

4. A method according to claim 1 wherein the nonionic polymer capable of hydrogen bonding with water to produce charge-neutralizing positive charge dipoles comprises a polyalkylene oxide.

5. A method according to claim 4 wherein the nonionic polymer comprises polyethylene oxide.

6. A method according to claim 1 wherein the nonionic polymer capable of hydrogen bonding with water to produce charge-neutralizing positive charge dipoles comprises a polyacrylamide-based nonionic polymer.

7. A method according to claim 5 wherein the minimum concentration of polymer in the aqueous solution is about 1 ppm.

8. A method of increasing the fragmentation rate of a solid and prolonging the life of a bit, cutting tool, grinding medium, or other polishing or drilling tool during drilling, tunneling, cutting, grinding, polishing or other operation involving said tools comprising the steps of:
   a) providing an aqueous solution containing a high molecular weight nonionic polymer capable of hydrogen bonding with water to produce charge-neutralizing positive charge dipoles;
   b) determining the range of concentrations of the polymer in the aqueous solution that will be effective in neutralizing the surface charge of the solid and producing a zero surface charge (ZSC) condition on the solid;
   c) adding to the solid during the drilling, tunneling, cutting, grinding or polishing operation the aqueous solution with the polymer concentration in the range of concentrations which will be effective in neutralizing the surface charge of the solid and producing a zero surface change (ZSC) condition on the solid; and
   d) maintaining the concentration of the polymer in the aqueous solution in the range of concentrations that are effective in neutralizing the surface charge of the solid and producing a zero surface charge (ZSC) condition on the solid over the course of the drilling operation.

9. A method according to claim 8 wherein the nonionic polymer comprises a polyalkylene oxide.

10. A method according to claim 9 wherein the nonionic polymer comprises polyethylene oxide.

11. A method according to claim 8 wherein the nonionic polymer comprises a polyacrylamide-based polymer than can hydrogen bond with water to produce charge-neutralizing positive charge dipoles.

12. A method according to claim 9 wherein the range of concentrations that will be effective in producing the zero surface charge condition on the solid will be from about 1-150 ppm of polymer in the aqueous solution.

13. A method according to claim 9 wherein the range of concentrations that will be effective in producing the zero surface charge condition on the solid will be from about 3 to about 50 ppm of polymer in the aqueous solution.

14. A method of decreasing the concentration of anionic or cationic water-soluble oils and cutting fluids required for lubrication of drill bits, drill steel, and cutting tools, while increasing the drilling or cutting rate comprising the steps of:
   a) determining the minimum concentration of a water-soluble oil needed for lubrication in a drilling or cutting fluid containing a high molecular weight nonionic polymer that can hydrogen bond with water molecules to produce positively charged dipoles;
   b) adding the minimum concentration of the water soluble oil needed for lubrication to the drilling or cutting fluid containing the nonionic polymer;
   c) determining the minimum concentration of both the water-soluble oil and nonionic polymer in the drilling or cutting fluid that will be effective in neutralizing the surface charge of a solid and producing a zero surface charge (ZSC) condition on the solid; and
   d) adding to the solid during a drilling or cutting operation an amount of the drilling or cutting fluid including the water-soluble oil and nonionic polymer equal to or greater than the minimum concentration needed to effect the charge-neutralization and obtain a zero surface charge (ZSC) condition on the solid.

15. A method according to claim 14 further comprising the steps of:
   e) determining the range of concentrations of both the water-soluble oil and the polymer in the drilling fluid that will be effective in neutralizing surface charge and obtaining the zero surface charge condition; and
   f) maintaining the concentration of both the water-soluble oil and the polymer in the drilling fluid in the range of concentrations that will neutralize the surface charge of the solid and produce the zero surface charge (ZSC) condition.

16. A method according to claim 14 wherein the nonionic polymer comprises a polyalkylene oxide.

17. A method according to claim 16 wherein the nonionic polymer comprises polyethylene oxide.

18. A method according to claim 1 wherein the solid being drilled comprises a rock formation.

19. A method according to claim 1 wherein the solid being drilled is a negatively charged solid material.

20. A method according to claim 1 wherein the solid being drilled is coal or concrete.

* * * * *